US012420458B2

United States Patent
Rinn et al.

(10) Patent No.: US 12,420,458 B2
(45) Date of Patent: Sep. 23, 2025

(54) MULTI-STAGE PRESSING PROCESS FOR PRODUCING A MOLDED PART SUCH AS A BIPOLAR PLATE FROM A HIGHLY FILLED THERMOSETTING MATERIAL

(71) Applicant: SCHUNK KOHLENSTOFFTECHNIK GMBH, Heuchelheim (DE)

(72) Inventors: Günter Rinn, Lahnau (DE); Hauke Voormann, Linden (DE); Sören Baumann, Gießen (DE); Mesut Altuntas, Frankfurt (DE)

(73) Assignee: SCHUNK KOHLENSTOFFTECHNIK GMBH, Heuchelheim (DE)

( * ) Notice: Subject to any disclaimer, the term of this patent is extended or adjusted under 35 U.S.C. 154(b) by 114 days.

(21) Appl. No.: 18/041,280

(22) PCT Filed: Oct. 9, 2020

(86) PCT No.: PCT/EP2020/078489
§ 371 (c)(1),
(2) Date: Feb. 10, 2023

(87) PCT Pub. No.: WO2022/037799
PCT Pub. Date: Feb. 24, 2022

(65) Prior Publication Data
US 2023/0302691 A1 Sep. 28, 2023

(30) Foreign Application Priority Data
Aug. 21, 2020 (DE) .............. 10 2020 121 997.0

(51) Int. Cl.
*B29C 43/14* (2006.01)
*B29C 43/34* (2006.01)
(Continued)

(52) U.S. Cl.
CPC .............. *B29C 43/14* (2013.01); *B29C 43/34* (2013.01); *B29C 43/361* (2013.01); *B29C 43/52* (2013.01);
(Continued)

(58) Field of Classification Search
CPC .......... B29C 43/14; B29C 43/34; B29C 43/52
See application file for complete search history.

(56) References Cited

U.S. PATENT DOCUMENTS

| 10,035,326 B2 * | 7/2018 | Le Gall ..................... B32B 1/08 |
| 2004/0033675 A1 | 2/2004 | Fleming et al. |
| 2014/0338825 A1 * | 11/2014 | Breault ............... H01M 8/0226 156/244.18 |

FOREIGN PATENT DOCUMENTS

| CN | 1926354 A | 3/2007 |
| CN | 108598495 A | 9/2018 |

(Continued)

OTHER PUBLICATIONS

Machine translation JP2016216485A (Year: 2016).*
(Continued)

*Primary Examiner* — Abbas Rashid
*Assistant Examiner* — Wayne K. Swier
(74) *Attorney, Agent, or Firm* — Maier & Maier, PLLC (57) ABSTRACT

A process for producing a molded part from a highly filled thermosetting starting material including: introducing the starting material into a prepressing tool; producing a preform from the starting material, the starting material being brought to a prepressing temperature by the prepressing tool and being compressed with a prepressing force to form the preform; removing the preform from the prepressing tool and introducing the preform into a finish pressing tool; and producing a finished part from the preform, the preform being brought to a finish pressing temperature by the finish pressing tool and being compressed with a finish pressing
(Continued)

force to form the finished part. Here, the prepressing temperature is lower than the finish pressing temperature and the finish pressing temperature is at least as high as an onset temperature of a curing reaction of the starting material.

15 Claims, 4 Drawing Sheets

(51) Int. Cl.
    *B29C 43/36*     (2006.01)
    *B29C 43/52*     (2006.01)
    *B29K 101/10*     (2006.01)
    *B29K 105/16*     (2006.01)

(52) U.S. Cl.
    CPC ............... *B29C 2043/143* (2013.01); *B29C 2043/3634* (2013.01); *B29K 2101/10* (2013.01); *B29K 2105/16* (2013.01)

(56) References Cited

FOREIGN PATENT DOCUMENTS

| | | |
|---|---|---|
| DE | 4420593 A1 | 12/1994 |
| DE | 10159007 A1 | 6/2003 |
| DE | 102004023712 B4 | 2/2007 |
| DE | 102011055107 A1 | 5/2013 |
| EP | 1470604 A2 | 10/2004 |
| EP | 3528326 A1 | 8/2019 |
| JP | 2004022207 A | 1/2004 |
| JP | 2006228607 A | 8/2006 |
| JP | 2008078107 A | 4/2008 |
| JP | 2009158118 A | 7/2009 |
| JP | 2014164802 A | 9/2014 |
| JP | 2016216485 A * | 12/2016 |
| KR | 20050052469 A | 6/2005 |
| WO | 2017/211423 A1 | 12/2017 |

OTHER PUBLICATIONS

Machine translation CN108598495A (Year: 2018).*
International Search Report issued on May 20, 2021 in corresponding International application No. PCT/EP2020/078489; 5 pages.
Office Action issued on Mar. 26, 2025, in corresponding Chinese Application No. 202080103324.1, 14 pages.
Office Action issued on Mar. 4, 2025, in corresponding Japanese Application No. 2023-512784, 6 pages.
Office Action issued on Jul. 11, 2025, in corresponding Chinese Application No. 2020801033241, 9 pages.

* cited by examiner

MULTI-STAGE PRESSING PROCESS FOR PRODUCING A MOLDED PART SUCH AS A BIPOLAR PLATE FROM A HIGHLY FILLED THERMOSETTING MATERIAL

FILED

The present invention relates to a process for producing a molded part from a highly filled thermosetting starting material. For example, the process may be used to produce graphite-filled bipolar plates, such as those used in fuel cells. The invention further relates to a corresponding pressing device suitable for performing the process.

BACKGROUND

Molded parts made from thermosetting materials may be produced using typical molding processes used in plastics technology, in which the material is brought into a molten state, introduced into a heated mold, and then cured under pressure and temperature.

If the molding compounds only have low flowability due to a high degree of filling, it may no longer be possible to use common molding processes such as injection molding, transfer molding or injection stamping. This typically applies to materials whose properties are largely defined by the type and volume fraction of fillers, such as sliding materials, friction linings, grinding discs or polymer-bonded materials with good electrical conductivity.

For these applications, mixtures of fillers, thermosetting polymers and other additives in powder or granular form are usually metered directly into heated compression molds, the molds are closed and the material is precompresssed, deaerated, finally compressed and cured. A specific formulation, a mold temperature and a force-displacement-time profile of a press program used in this process define not only a cycle time, but also the material properties to a large extent.

A special form of highly filled thermosetting materials is used in the manufacture of bipolar plates for polymer membrane fuel cells. Graphite-filled polymers are superior to metallic materials in these applications due to their corrosion resistance in acidic, warm and humid conditions. However, the required electrical conductivity is only achieved with a very high filler content of 80 to 90 mass percent, which is only possible by precise adjustment of formulation components and pressing conditions.

Typical formulation and process descriptions have been published in scientific publications and in patent literature for over 20 years. A typical example is described in EP 3 528 326 A1.

SUMMARY

There may be a need for a process for producing a molded part from a highly filled thermosetting starting material which permits economical (high-volume) production of molded parts from highly filled thermosetting molding compounds, in particular graphite bipolar plates, with comparatively short cycle times. Moreover, there may be a need for a pressing device to perform such a process.

A first aspect of the invention relates to a process for producing a molded part from a highly filled thermosetting starting material. The process comprises the following steps, which may preferably be performed in the specified order: introducing the starting material into a prepressing tool, producing a preform from the starting material, the starting material being brought to a prepressing temperature by means of the prepressing tool and being compressed with a prepressing force to form the preform, removing the preform from the prepressing tool and introducing the preform into a finish pressing tool, and producing a finished part from the preform, the preform being brought to a finish pressing temperature by means of the finish pressing tool and being compressed with a finish pressing force to form the finished part. Here, the prepressing temperature is lower than the finish pressing temperature and the finish pressing temperature is at least as high as the onset temperature of the curing reaction of the starting material. More specifically, the finish pressing temperature may be at least as high as the onset temperature of the curing reaction of the binder in the starting material.

The starting material may be a powder and/or granular pre-material. The starting material may, for example, contain graphite or other predominantly carbon-containing compounds as filler. However, starting materials with other types of fillers are also possible. In this context, "highly filled" may be understood to mean, for example, a filler content of at least 70 mass percent. In particular, the starting material may have a filler content of at least 80 or even at least 90 mass percent. In addition to the filler, the starting material may contain a binder system consisting of epoxy resin, e.g. of the epoxidized cresol-novolac type, hardener, e.g. novolac phenolic resin, and a curing catalyst, e.g. from the group of arylimidazoles or alkylimidazoles, and a releasing agent, e.g. wax.

For example, a typical formulation may include e.g. approximately 84% graphite, 10% epoxidized cresol novolac as the resin, 5% novolac phenolic resin as the curing agent, 1% wax as the releasing agent, and 0.1% 2-methylimidazole as the curing catalyst.

Depending on the composition, the starting material may have a certain onset temperature at which chemical cross-linking of the starting material begins, i.e. a curing reaction is initiated. The onset temperature may depend in particular on any curing catalyst contained in the starting material. The onset temperature may, for example, have been determined experimentally by means of differential scanning calorimetry.

A prepressing tool or finish pressing tool may generally be understood to mean a heatable, two-part or multi-part compression mold for producing a molded part under the action of pressure and heat. The prepressing tool and the finish pressing tool may be arranged in different production stations, i.e. locally separated from each other. Also, the prepressing tool and the finish pressing tool may differ in their mold volume and/or die geometry (see below).

Using the prepressing tool, the starting material may be formed into a preform. The prepressing temperature should be within the softening range of the binder in order to achieve good compression of the preform. Preferably, full-surface vacuum grippers may be used for transferring the preform into the finish pressing tool, which may be heatable, for example, to prevent cooling during transfer or to further increase the temperature of the preform. Depending on the prepressing temperature, it is possible that chemical cross-linking of the starting material already begins during production of the preform. However, the prepressing temperature should be selected such that chemical crosslinking during precompression is at least largely prevented and/or is greatly slowed down. Cohesion of the preform is then predominantly effected by physical bonding forces.

Introduction of the starting material into the prepressing tool may be manual, partially automated or fully automated. Likewise, removal of the preform from the prepressing tool and/or insertion of the preform into the finish pressing tool may be manual, partially automated or fully automated (see below).

The precompression parameters, such as the prepressing temperature or the prepressing force, and the final compression parameters, such as the finish pressing temperature or the finish pressing force, may differ significantly from each other, at least in part. In particular, the finish pressing temperature should be significantly higher than the prepressing temperature in order to effect a fastest possible curing during finishing. At the same time, the prepressing temperature should not be too high for the reasons mentioned above. Likewise, the prepressing force and the finish pressing force may differ from each other. For example, a different pressing program may be used when producing the preform than when producing the finished part. The press programs may differ from each other, for example, in terms of their force-displacement-time profile.

The molding may be done, for example, by pressing at 185° C., at a pressing force of 37 MPa and at a hold time of 10 s or less. After this pressing time, the finished part, such as a plate, may be removed from the die without deformation. Final curing may then be achieved, for example, by post-curing at 150° C. to 200° C. for a period adapted to the residual reactivity and temperature. The shaping process may be followed by additional post-treatment steps, for example to deburr and/or open apertures, to reduce contact resistance and/or to reduce the wetting angle.

When forming thermosetting materials from powder or granular pre-material, the steps of preheating, precompression and deaeration require a certain amount of time. At the same time, cycle times should be as short as possible for the purposes of economical production, especially of high-volume components.

Molding at temperatures of e.g. 150° C., or generally at temperatures only slightly above the cure onset temperature, allows good deaeration and compression. However, the required pressing time may then be in the range of several minutes.

If the curing temperature is increased, the time window for preheating, precompression and deaeration may become correspondingly narrower. This may therefore increase the risk of certain quality requirements not being met. For example, bubbles or shrinkage cavities may form due to insufficient deaeration, or insufficient compression may occur due to a spontaneously initiated curing reaction.

It is described in the above-mentioned EP 3 528 326 A1 that pressing times of less than 10 s are only possible by combining several parameters. It is described that graphite with a median d50 particle size of 30 µm to 100 µm and a springback characteristics of 20% to 70% is used for this purpose when the graphite is pressed dry. It is stated that here a higher springback would result in insufficiently compressed plates, while a lower springback would result in materials with low flexural strength. Furthermore, an arylimidazole is assumed as the curing catalyst. The use of the much more reactive alkylimidazole and in particular of 2-methylimidazole is expressly excluded in this context, since uniform compression would then allegedly no longer be possible.

One objective of the invention presented here is therefore to enable economical (high-volume) production of molded parts from highly filled thermosetting molding compounds, in particular graphite bipolar plates, with comparatively short cycle times. Another objective of the invention presented herein is to enable such manufacturing without the aforementioned limitations in terms of raw material selection.

According to the invention, these objectives are achieved by manufacturing the molded parts in multiple cavities, as described in more detail below.

One of the advantages offered by embodiments of the process described herein for the rational production of molded parts from highly filled thermosetting materials, in particular graphite bipolar plates for fuel cells, for example, is that the steps of preheating, precompression and deaeration of the starting material may be at least largely decoupled from the curing step. In other words, the curing temperature may be increased without the time window for preheating, precompression and deaeration becoming correspondingly narrower. This may therefore reduce the risk of certain quality requirements not being met. For example, this may prevent bubbles or shrinkage cavities from forming due to insufficient deaeration, or insufficient compression occurring due to a spontaneously initiated curing reaction. Furthermore, such a process enables the production of molded parts from highly filled thermosetting materials without the aforementioned limitations in terms of raw material selection. In particular, this may reduce a pressure hold time during curing to 10 s or less.

A second aspect of the invention relates to a pressing device for producing a molded part from a highly filled thermosetting starting material in a process according to an embodiment according to the first aspect of the invention. The pressing device comprises a prepressing tool for producing the preform from the starting material. The prepressing tool is designed to bring the starting material to the prepressing temperature and compress it with the prepressing force to form the preform. The pressing device further comprises a finish pressing tool for producing the finished part from the preform. The finish pressing tool is configured to bring the preform to the finish pressing temperature and compress it with the finish pressing force to form the finished part.

Molded parts such as bipolar plates for fuel cells may be efficiently mass produced by means of such a pressing device. At the same time, a very high production quality may be achieved with such a pressing device.

Without in any way limiting the scope of the invention, ideas and possible features relating to embodiments of the invention may be considered to be based, inter alia, on the ideas and findings described below.

According to one embodiment, the prepressing temperature is lower than the onset temperature. For example, the prepressing temperature may be at least 5° C., preferably at least 10° C. or even at least 20° C. lower than the onset temperature. This allows the starting material to be compacted without chemical crosslinking of the starting material having started. Thus, for example, the steps of preheating, precompression and deaeration of the starting material may take place independently of the step of curing the starting material.

According to one embodiment, the finish pressing temperature is at least 170° C., preferably at least 190° C. In other words, the finish pressing temperature may be significantly higher than the onset temperature. This has the effect of significantly speeding up curing of the finished part without compromising quality. Thus, for example, pressure hold times of less than 10 s may be achieved.

According to one embodiment, the prepressing temperature is at most 150° C., preferably at most 120° C. This may greatly slow down or even completely prevent curing during preheating, precompression and deaeration. Thus, good precompression and good deaeration may be ensured without disproportionately extending the cycle times. Depending on the finish pressing temperature, the cycle times may even be shortened compared to conventional pressing processes.

According to one embodiment, the preform is subjected to the finish pressing force for at most 10 s, preferably for at most 5 s. This allows comparatively short cycle times to be achieved.

According to one embodiment, the starting material contains graphite as filler. This means that the process may be used, for example, for the efficient (high-volume) production of bipolar plates or similar.

According to one embodiment, the starting material contains a binder and an alkylimidazole as a curing catalyst for the binder. The binder may be an epoxy binder, for example. This may significantly accelerate curing compared to starting materials without alkylimidazole, such as starting materials containing arylimidazoles such as 2-phenylimidazole as a binder.

According to one embodiment, the starting material contains 2-methylimidazole as a curing catalyst. This may significantly accelerate curing compared to starting materials without 2-methylimidazole, such as starting materials containing arylimidazole or other alkylimidazoles as binders. In particular, curing may be accelerated in such a way that curing is already completed before the finished part is removed from the finish pressing tool. This eliminates a need for thermal post-treatment of the finished part.

According to one embodiment, the starting material is introduced into the prepressing tool by doctoring. Compared to pouring or other insertion methods, this may achieve a more uniform distribution of the starting material in the prepressing tool.

For example, the prepressing tool may include an upper die and a lower die, each configured with small offsets so that the fill quantities on different sub-surfaces, such as the edge, seal, flow distributor and channel areas, correspond to the respective material requirements on these sub-surfaces. This means that uniform precompression may be achieved even on the preform. This means that undesirable density and/or thickness variations of the finished part, for example in the form of a bipolar plate, may be avoided. Furthermore, the pressing force required during the production of the finished part may be reduced.

According to one embodiment, a density of the preform is at least 80%, preferably at least 90% of a density of the finished part. Prepressing the preform in this way means that a correspondingly higher finish pressing temperature may be selected. In other words, curing in the finish pressing tool may take place at a correspondingly higher curing temperature and thus correspondingly faster.

According to one embodiment, the starting material is repeatedly compressed and deaerated to produce the preform. For this purpose, for example, an upper press die of the prepressing tool may be placed on the preform with a constant or increasing force and then slightly lifted off again.

According to one embodiment, the prepressing force is varied during production of the preform. For example, the prepressing force may be varied according to a predefined prepressing force-displacement-time profile.

According to one embodiment, the finish pressing force is varied during production of the finished part. For example, the finish pressing force may be varied according to a predefined finish pressing force-displacement-time profile. Preferably, the finish pressing force may initially be increased very quickly to a maximum value in order to achieve plastic flow of the molding compound or preform. After only 1 s to 2 s or as soon as the curing reaction of the binder begins, the pressing force may then be significantly reduced again.

According to one embodiment, the pressing device comprises a heatable gripping device configured to remove the preform from the prepressing tool and insert it into the finish pressing tool. The gripping device may be, for example, a gripping robot, a gripping arm or the like. The gripping device may be used to transfer the preform semi-automatically or fully automatically. Automated transfer of this kind has the advantage that relatively little time elapses between the prepressing and the finish pressing, so that the cycle times may be kept as short as possible overall. With the aid of a suitable gripping device, the duration of the transfer may be reduced to 2 s or less, for example.

According to one embodiment, the prepressing tool and the finish pressing tool have different tool geometries. For example, the finish pressing tool may have a tool geometry that replicates a final geometry of the finished part, while the prepressing tool may have a tool geometry that deviates from this final geometry to a greater or lesser extent. For example, the final geometry may replicate relatively delicate structures such as channel structures or the like. In contrast, the prepressing tool may generally be much more approximate, e.g. more planar, in shape. In other words, the preform and the finished part may have different dimensions. The preform and the finished part may also differ in terms of their density.

It is pointed out that possible features and advantages of embodiments of the invention are described partly with reference to a process for producing a molded part from a highly filled thermosetting starting material, and partly with reference to a pressing device capable of carrying out such a process. A person skilled in the art will recognize that the features described for individual embodiments may be transferred, adapted and/or interchanged in an analogous and appropriate manner to other embodiments to arrive at further embodiments of the invention and possibly synergistic effects.

BRIEF DESCRIPTION OF THE DRAWINGS

Advantageous embodiments of the invention are further explained below with reference to the accompanying drawings, where neither the drawings nor the explanations are to be construed as limiting the invention in any way.

DETAILED DESCRIPTION

Figure 1:
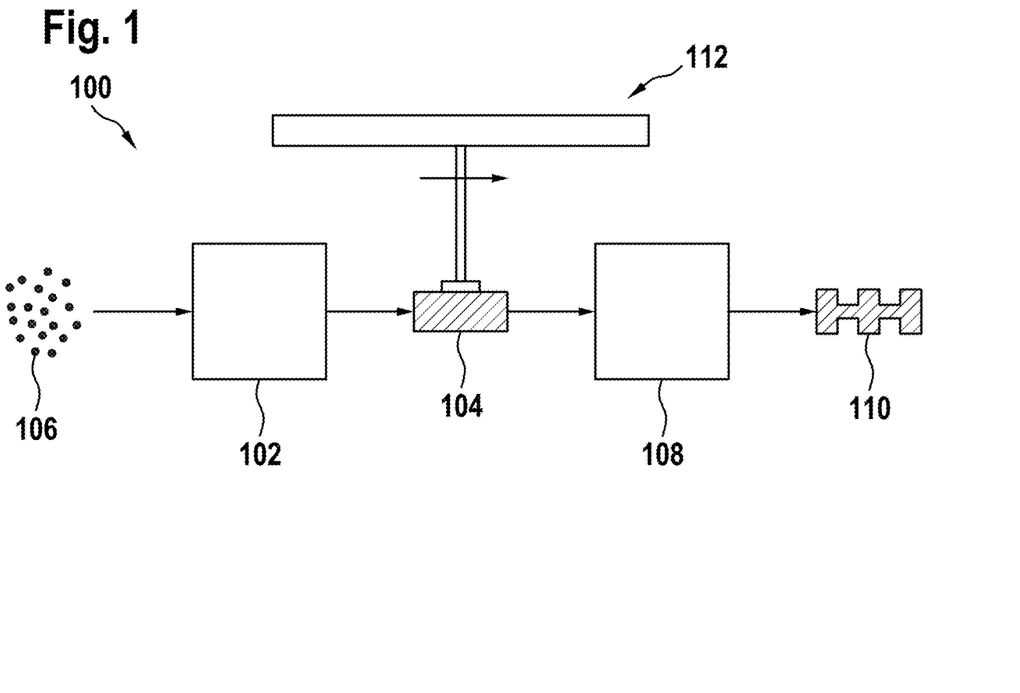
FIG. 1 shows a schematic representation of a pressing device according to an embodiment of the invention.

FIG. 1 shows a schematic representation of a pressing device 100 for producing a molded part from a highly filled thermosetting material. Firstly, the pressing device 100 comprises a prepressing tool 102 for producing a preform 104 from a starting material 106. The prepressing tool 102 is configured to bring the starting material 106 to a prepressing temperature and compress it with a prepressing force to form the preform 104. Secondly, the pressing device 100 comprises a finish pressing tool 108 for producing a finished part 110 from the preform 104. The finish pressing tool 108 is configured to bring the preform 104 to a finish pressing temperature and compress it with a finish pressing force to form the finished part 110. In this process, the prepressing temperature is lower than the finish pressing temperature. Furthermore, the finish pressing temperature is at least as high as an onset temperature of a curing reaction of the starting material 106, more specifically a curing reaction of a binder in the starting material 106.

The transfer of the preform 104 may optionally be performed with the aid of a gripping device 112, which removes the preform 104 from the opened prepressing tool 102 and inserts it into the opened finish pressing tool 108.

Figure 2:
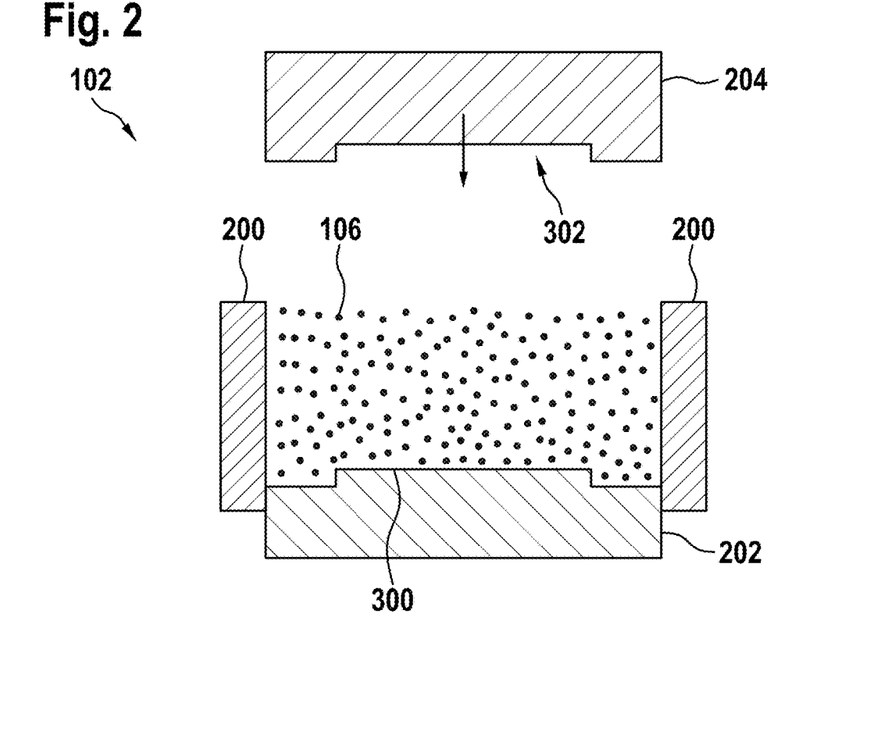
FIG. 2 shows a schematic representation of a prepressing tool of the pressing device from FIG. 1 in the open state.

FIG. 2 shows the prepressing tool 102 in the open state. Here, the prepressing tool 102 comprises a mold frame 200, a prepressing lower die 202, and a prepressing upper die 204 arranged opposite the prepressing lower die 202. When open, the prepressing upper die 204 is moved away from the mold frame 200. The mold frame 200 and the prepressing lower die 202 define a container into which the starting material 106 or pressing material 106 is filled in the form of a granulate.

Figure 3:
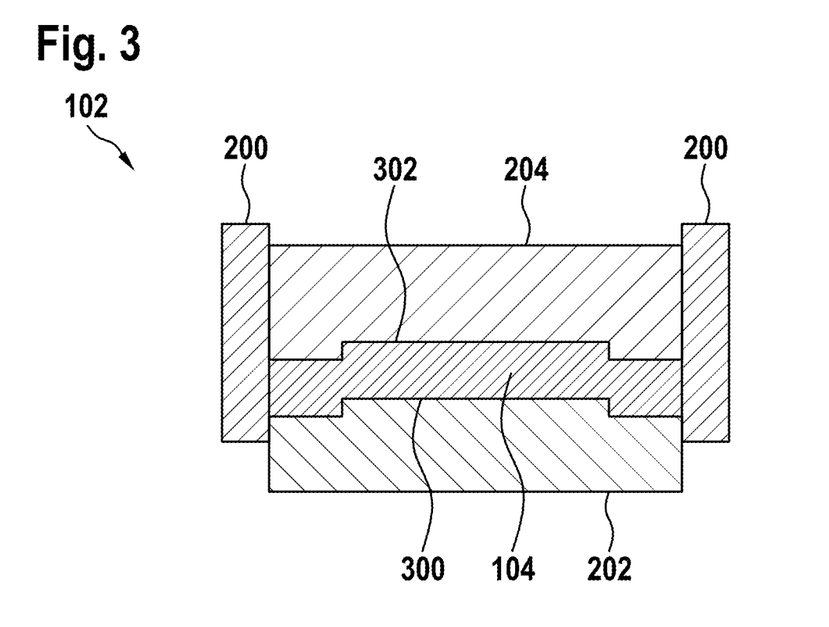
FIG. 3 shows a schematic representation of the prepressing tool from FIG. 2 in the closed state.

FIG. 3 shows the prepressing tool 102 in a closed state during prepressing, for example at 100° C. During this process, the container is closed by the prepressing upper die 204 and the starting material 106 is compressed between the mold frame 200, the prepressing lower die 202 and the prepressing upper die 204 with a suitable prepressing force to form the preform 104 in the form of a prepressed plate. To bring the starting material 106 to the prepressing temperature, the prepressing lower die 202 and the prepressing upper die 204 may be heatable. In addition, the mold frame 200 may be heatable.

As shown in FIGS. 2 and 3, the prepressing lower die 202 and the prepressing upper die 204 may each have a suitably contoured pressing surface. For example, the prepressing lower die 202 may have a raised portion 300 and the prepressing upper die 204 may have a recessed portion 302. In this regard, an outer contour of the raised portion 300 may be configured to correspond to an inner contour of the recessed portion 302.

Figure 4:
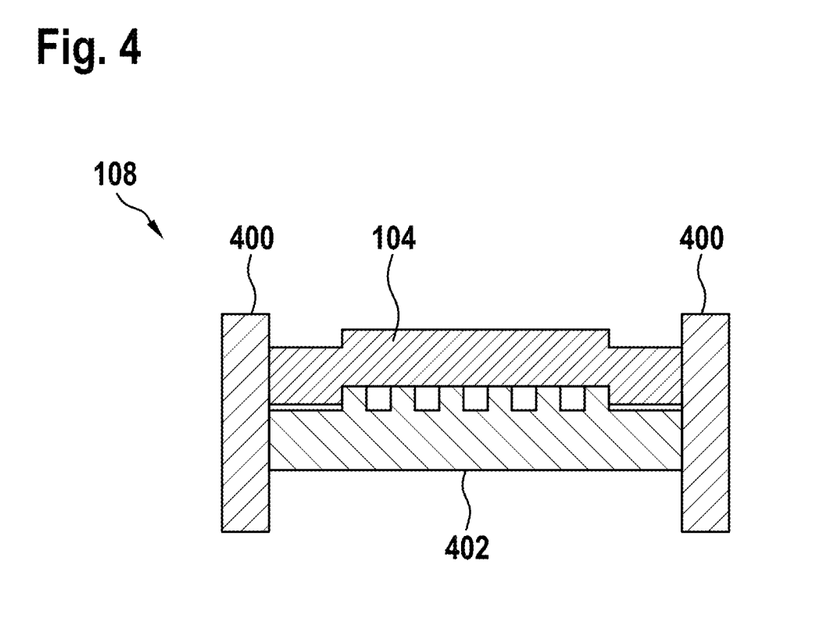
FIG. 4 shows a schematic representation of a finish pressing tool of the pressing device from FIG. 1 in the open state with inserted preform.
Figure 5:
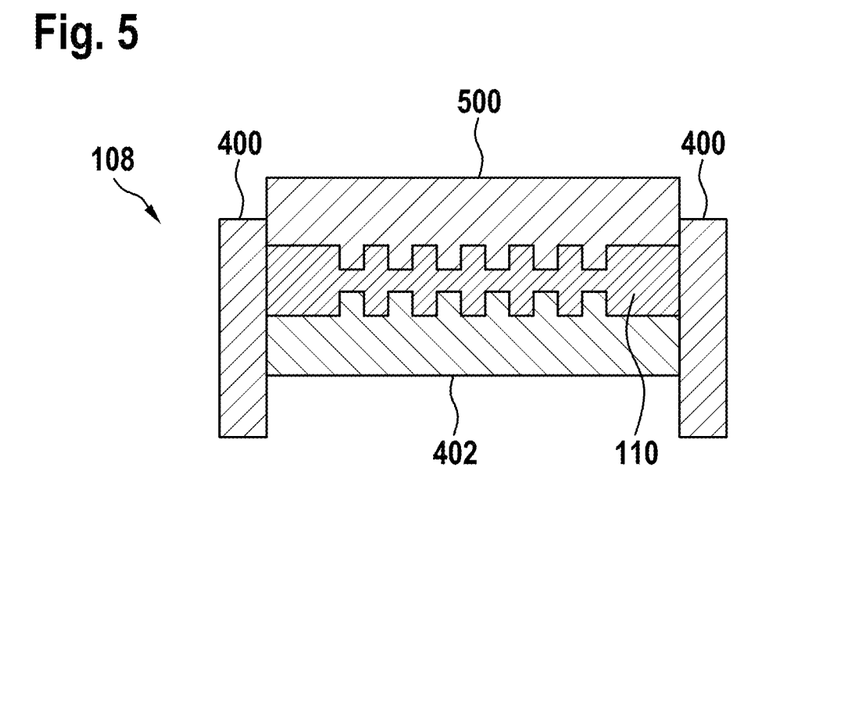
FIG. 5 shows a schematic representation of the finish pressing tool from FIG. 4 in the closed state during the production of a finished part from the preform.
Figure 6:
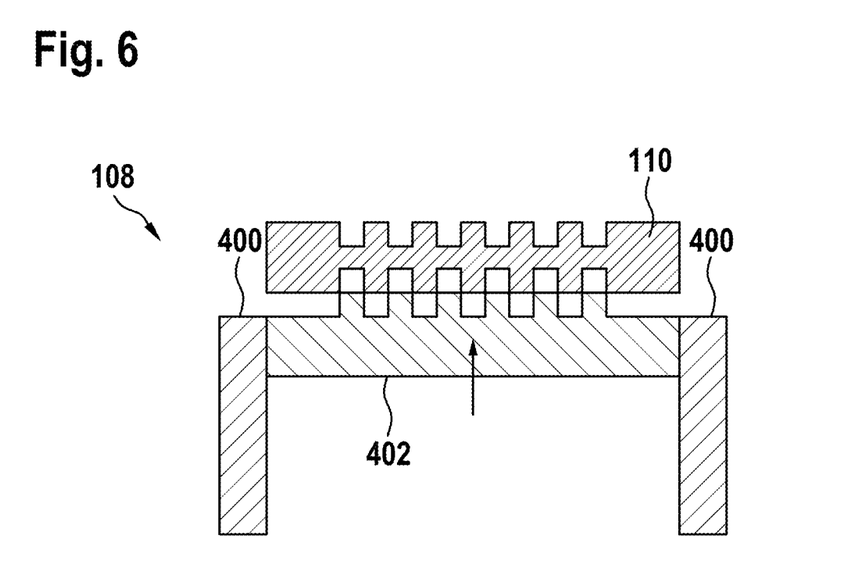
FIG. 6 shows a schematic representation of the finish pressing tool from FIG. 4 in the open state with the finished part ready for removal.

The finish pressing tool 108 is shown in more detail in FIGS. 4 through 6. For example, the preform 104 may be automatically removed from the opened prepressing tool 102 and inserted into the opened finish pressing tool 108 by means of the gripping device 112 (see FIG. 1), which may also be heatable.

Like the prepressing tool 102, the finish pressing tool 108 comprises another mold frame 400, a finish pressing tool lower die 402, and a finish pressing tool upper die 500 (see FIG. 5). For example, the finish pressing tool lower die 402 and the finish pressing tool upper die 500 may also each have a specially shaped pressing surface, such as a grooved or fluted pressing surface, as shown by way of example in FIG. 5. The respective pressing surfaces of the finish pressing tool lower die 402 and the finish pressing tool upper die 500 may, for example, be shaped complementarily to one another.

It is possible that the prepressing tool 102 and the finish pressing tool 108 have different tool geometries. In this example, the prepressing tool 102 and the finish pressing tool 108 differ in the configuration of their respective pressing surfaces.

To bring the preform 104 to the finish pressing temperature, the finish pressing tool lower die 402 and the finish pressing tool upper die 500 may be heatable. The additional mold frame 400 may also be heatable.

FIG. 4 shows the finish pressing tool 108 in the open state with the inserted preform 104.

FIG. 5 shows the finish pressing tool 108 in the closed state during production of the finished part 110. This process involves compressing the preform 104 at a finish pressing temperature of e.g. 180° C. with a corresponding finish pressing force to form the finished part 110.

In keeping with the contour of the pressing surfaces and the selected starting material 106, the finished part 110 may be, for example, a bipolar plate with channel structures on both sides and a peripheral edge.

Finally, the finished part 110 is ejected from the finish pressing tool 108, as shown in FIG. 6.

Figure 7:
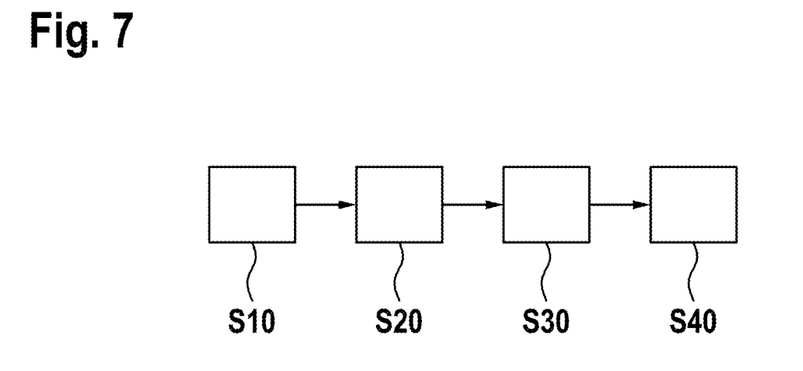
FIG. 7 shows a flow chart of a pressing process according to an embodiment of the invention.

FIG. 7 shows a flow diagram of a pressing process, such as may be carried out by the pressing device 100 shown in FIGS. 1 to 6.

In step S10, the starting material 106 is introduced into the prepressing tool 102.

In step S20, the preform 104 is produced from the starting material 106. This involves bringing the starting material 106 up to the prepressing temperature, which is lower than the finish pressing temperature, by means of the prepressing tool 102 and compressing it with the prepressing force to form the preform 104.

In step S30, the preform 104 is removed from the prepressing tool 102 and placed into the finish pressing tool 108.

In step S40, the finished part 110 is produced from the preform 104. This process involves bringing the preform 104 up to the finish pressing temperature, which is at least as high as the onset temperature of the curing reaction of the binder in the starting material 106, by means of the finish pressing tool 108, and compressing it with the finish pressing force to form the finished part 110.

The key to the solution according to the invention is the division of the pressing process for pressing molded parts into two subprocesses in an interlinked two-station press.

The invention is described once again below in different terms with reference to FIGS. 1 through 6, using the example of the production of plates, such as graphite bipolar plates for a fuel cell. However, the invention may also be used to produce non-plate-type components.

According to one embodiment, the starting material 106 in the form of a powder or granular mixture, which may include fillers, binder components, and additives, is first loaded into the prepressing tool 102 in a prepressing station. The prepressing tool 102 may be heated to a prepressing temperature that is lower than the onset temperature of the curing reaction of the starting material 106. This means that even with highly reactive molding compounds, for example using 2-methylimidazole as the curing catalyst of an epoxy binder, good preheating, good deaeration and good precompression may be achieved without the curing reaction starting. However, it is also possible for the prepressing temperature to be approximately the same as or even higher than the onset temperature, as long as it is ensured that curing of the starting material is relatively slow.

According to one embodiment, the starting material 106 is doctored into the open prepressing tool 102. This serves to ensure particularly uniform material distribution in the prepressing tool, which reduces fluctuations in thickness and density. For example, the prepressing tool 102 may comprise lower and upper tooling plates with offsets (see raised portion 300 and recessed portion 302 in FIGS. 2 and 3). By bringing the tooling plates together, the starting material 106 may be formed, i.e. precompressed, into the preform 104. These offsets may be designed in such a way that the different surface-related material requirements may be taken into account while still allowing uniform precompression to be achieved.

Alternatively, it is also possible to pour the starting material 106 into the prepressing tool 102. For example, the starting material 106 may be poured into different areas of the prepressing tool 102. The prepressing tool 102 may be used to compress the starting material 106 to about 90% of a final compression, for example.

The steps of preheating, precompression and/or deaeration may be repeated several times during the prepressing. In other words, the prepressing may be performed in two or more than two successive substeps with increasing prepressing pressures, wherein each of which substeps may include the steps of preheating, precompression and/or deaeration (see above). For example, at a prepressing temperature of 100° C., the prepressing pressure may increase in three stages from 2 MPa to 10 MPa to 30 MPa.

For example, the prepressing temperature may be between 70° C. and 140° C., preferably between 90° C. and 120° C.

Prepressing may ensure that the plastic compression of the starting material 106 takes place in the absence of any competing curing reaction or, at most, with only a very slow curing reaction. In this way it is possible to achieve well-formed grain boundaries between the powder or granular particles, which is a prerequisite for good mechanical properties and low gas permeability of the finished part 110 in the form of the finished pressed plate.

Prepressing is followed by finish pressing in a finish pressing station with the finish pressing tool 108 separate from the prepressing tool 102. For this purpose, the preform 104, i.e. the prepressed and preheated plate, is transferred from the prepressing station to the finish pressing tool station, more precisely to the finish pressing tool 108, for example by means of the heated gripping device 112.

For example, the gripping device 112 may be heated to a temperature similar to the prepressing temperature and/or the onset temperature and/or a temperature of the finish pressing tool 108, meaning that a gripping surface of the gripping device 112 may be tempered to one of cited temperatures plus/minus e.g. 20° C. or plus/minus 10° C. The transfer should take place relatively quickly. In particular, the transfer should take less than 2 s.

The finish pressing tool 108 produces the final geometry of the finished part 110. The finish pressing tool 108 and the prepressing tool 102 may be shaped differently. For example, the prepressing tool 102 may only replicate an approximate version of the final geometry of the finished part 110.

The finish pressing tool 108 is heated to a finish pressing temperature that produces a very fast curing reaction, for example to at least 170° C., preferably to at least 190° C. A finish pressing temperature of 200° C. and more is also conceivable. In general, the finish pressing temperature should be significantly higher than the onset temperature of the curing reaction of the starting material 106, since increasing the curing temperature will correspondingly shorten the curing time.

Due to the high precompression of the preform 104, the finish pressing tool 108 may be closed relatively quickly and pressure may be built up correspondingly quickly.

For example, when using 2-methylimidazole as a curing catalyst for the epoxy resin and a finish pressing temperature of 170° C., demolding may take place after pressure hold times of only 8 s to 10 s. With a finish pressing temperature of approx. 190° C., for example, it is possible to achieve pressure hold times of less than 5 s.

In the same way as for prepressing, the parameters of finish pressing, such as the finish pressing temperature, the finish pressing force or a pressure hold time, may be varied during finish pressing.

After finish pressing, the finish pressing tool 108 may be opened and the finished part 110, in the form of the finished pressed plate, may be removed from the finish pressing tool 108. This may again be done by means of the gripping device 112, by means of another suitable gripping device, or manually.

This may be followed by an additional heat treatment. Depending on the reactivity of the binder system used, such post-curing may be significantly shortened with the process described here. In the case of very high reactivity, for example when 2-methylimidazole is used, post-curing may even be omitted altogether, since in this case curing is already largely complete after final pressing.

Using this two-stage pressing process, it is possible to eliminate or overcome, for example, the limitations mentioned above with reference to the prior art described above in terms of raw material selection for the production of gas-tight separator plates with high flexural strength and short cycle times. In particular, flexural strengths of more than 60 MPa may be achieved when using graphite with a springback of less than 20% or more than 70%. Furthermore, the process described herein may also be performed using 2-methylimidazole as a curing catalyst without adversely impacting the properties of the finished part. The extremely rapid curing reaction that results leads to a good degree of crosslinking even with very short process times.

The potential for a significant reduction in cycle time was demonstrated with flat and structured test dies on various automatic presses. Here, instead of a linked production process, sheets of ready-to-press granulate were prepressed in separate work steps and the prepressed sheets were finish-pressed at increased mold temperatures. The pressed plates exhibited significantly better mechanical properties and more uniform compression compared to conventional processes.

Finally, it is noted that terms such as "comprising," "including," etc. do not exclude other elements or steps, and terms such as "one" or "a" do not exclude a plurality. It is further noted that features or steps that have been described with reference to any of the above embodiments may also be used in combination with other features or steps of other embodiments described above. Reference numerals in the claims are not to be regarded as a limitation.

LIST OF REFERENCE NUMERALS

100 Pressing device
102 Prepressing tool

104 Preform
106 Starting material
108 Finish pressing tool
110 Finished part or molded part
112 Gripping device
200 Mold frame
202 Prepress lower die
204 Prepress upper die
300 Raised portion
302 Recessed portion
400 Additional mold frame
402 Finish pressing tool lower die
500 Finish pressing tool upper die

The invention claimed is:

1. Process for producing an electrically conductive molded part forming a bipolar plate for a fuel cell from a highly filled thermosetting starting material, the process comprising:
introducing the starting material into a prepressing tool, wherein the highly filled thermosetting starting material contains at least one of graphite and other predominantly carbon-containing compounds as filler in the starting materials with a filler content of at least 70 mass percent and wherein the starting material comprises 2-methylimidazole as a curing catalyst operable to accelerate curing of the starting material;
producing a preform from the starting material, wherein the starting material is brought to a prepressing temperature by means of the prepressing tool including a prepressing lower die and a prepressing upper die each having contoured pressing surfaces and is compressed with a prepressing force to form the preform;
removing the preform from the prepressing tool and introducing the preform into a finish pressing tool; and
producing a finished part from the preform, wherein the preform is brought to a finish pressing temperature by means of the finish pressing tool and is compressed with a finish pressing force to form the finished part;
wherein the prepressing temperature is lower than the finish pressing temperature;
wherein the finish pressing temperature is at least as high as an onset temperature of a curing reaction of the starting material.

2. The process according to claim 1,
wherein the prepressing temperature is lower than the onset temperature.

3. The process according to claim 1,
wherein the finish pressing temperature is at least 170° C.

4. The process according to claim 1,
wherein the prepressing temperature is at most 150° C.

5. The process according to claim 1,
wherein the preform is subjected to the finish pressing force for at most 10 s.

6. The process according to claim 1,
wherein the starting material contains graphite as filler.

7. The process according to claim 1,
wherein the starting material is introduced into the prepressing tool by doctoring.

8. The process according to claim 1,
wherein a density of the preform is at least 80% of a density of the finished part.

9. The process according to claim 1,
wherein the starting material is repeatedly compressed and deaerated to produce the preform.

10. The process according to claim 1,
wherein the prepressing force is varied during production of the preform.

11. The process according to claim 1,
wherein the finish pressing force is varied during production of the finished part.

12. A pressing device for producing a molded part forming a bipolar plate for a fuel cell from a highly filled thermosetting starting material in a process according to claim 1, wherein the pressing device comprises:
a prepressing tool for producing the preform from the starting material, the prepressing tool including a prepressing lower die and a prepressing upper die each having contoured pressing surfaces and being configured to bring the starting material to the prepressing temperature and compress it with the prepressing force to form the preform; and
a finish pressing tool for producing the finished part from the preform, the finish pressing tool being configured to bring the preform to the finish pressing temperature and compress it with the finish pressing force to form the finished part, wherein the finish pressing tool has a tool geometry that replicates a final geometry of the finished part with channel structures.

13. The pressing device according to claim 12, further comprising:
a heatable gripping device configured to remove the preform from the prepressing tool and insert it into the finish pressing tool.

14. Pressing device according to claim 12,
wherein the prepressing tool and the finish pressing tool have different tool geometries.

15. Process for producing a molded part forming a bipolar plate for a fuel cell from a highly filled thermosetting starting material, the process comprising:
introducing the starting material into a prepressing tool, wherein the highly filled thermosetting starting material contains at least one of graphite and other predominantly carbon-containing compounds as filler in the starting materials with a filler content of at least 70 mass percent and wherein the starting material comprises 2-methylimidazole as a curing catalyst;
producing a preform from the starting material, wherein the starting material is brought to a prepressing temperature by means of the prepressing tool including a prepressing lower die and a prepressing upper die each having contoured pressing surfaces and is compressed with a prepressing force to form the preform;
removing the preform from the prepressing tool and introducing the preform into a finish pressing tool; and
producing a finished part from the preform, wherein the preform is brought to a finish pressing temperature by means of the finish pressing tool and is compressed with a finish pressing force to form the finished part;
wherein the prepressing temperature is lower than the finish pressing temperature;
wherein the finish pressing temperature is at least as high as an onset temperature of a curing reaction of the starting material; and
wherein the finish pressing force is varied during production of the finished part.

* * * * *